United States Patent [19]

Hook et al.

[11] Patent Number: 5,025,951
[45] Date of Patent: Jun. 25, 1991

[54] ELECTRONIC SEED RATE SYSTEM FOR A GRAIN DRILL

[75] Inventors: Richard W. Hook, Des Moines, Iowa; Duane A. Coordes, Rock Island, Ill.

[73] Assignee: Deere & Company, Moline, Ill.

[21] Appl. No.: 429,664

[22] Filed: Oct. 31, 1989

[51] Int. Cl.$^5$ .............................................. G07F 11/00
[52] U.S. Cl. ......................................... 221/13; 221/2; 221/131; 221/185; 221/258; 222/63; 222/368; 222/614; 222/624; 222/626; 111/177; 111/904
[58] Field of Search .......................... 221/2, 7, 8, 9, 13, 221/131, 165, 185, 224, 225, 258; 222/40, 63, 52, 71, 273, 274, 298, 301, 305, 307, 308, 312, 333, 368, 626, 313, 614, 624; 111/170, 177, 904

[56] References Cited

U.S. PATENT DOCUMENTS

| | | | |
|---|---|---|---|
| 3,355,102 | 11/1967 | Gregory, Jr. | 221/7 X |
| 3,511,411 | 5/1970 | Weiss | 222/52 |
| 3,537,091 | 10/1970 | Schenkenberg | 221/7 X |
| 3,620,419 | 11/1971 | Bailey | 222/313 X |
| 4,122,974 | 10/1978 | Harbert et al. | |
| 4,277,833 | 7/1981 | Steffen | 221/8 X |
| 4,333,096 | 6/1982 | Jenkins et al. | 221/8 X |
| 4,369,895 | 1/1983 | McCarty et al. | 221/8 X |
| 4,408,704 | 10/1983 | Steilen . | |
| 4,697,173 | 9/1987 | Stokes . | |

FOREIGN PATENT DOCUMENTS

| | | |
|---|---|---|
| 0254218 | of 0000 | European Pat. Off. . |
| 3310424 | of 0000 | Fed. Rep. of Germany . |
| 2326137 | of 0000 | France . |
| 2423963 | of 0000 | France . |
| 2568031 | of 0000 | France . |
| 2133556 | of 0000 | United Kingdom . |

OTHER PUBLICATIONS

PC2 Planter Computer User's Manual, First Edition, Dec. 1986; Cover through p. 28, and Appendix, p. 51, and Pioneer Technology PC2 brochure show Planter Computers for Monitoring Seeds.

Primary Examiner—H. Grant Skaggs
Assistant Examiner—Tuan N. Nguyen

[57] ABSTRACT

An agricultural implement such as a grain drill or similar seeding implement includes a plurality of transversely spaced seed meters having fluted feed wheels fixed to and transversely movable with a drive shaft which is controlled by an actuator to vary seeding rate in response to an indication provided by a sensor or sensors associated with one or more of the meters. An electronic controller includes a desired seeding rate input and provides an indication of the actual seeding rate. In one embodiment of the invention, an error signal indicative of the difference between the actual and desired seeding rates is utilized in a closed-loop system to move the shaft to automatically maintain the desired seeding rate. In a wider implement with more than one shaft, a switching circuit is utilized to permit a single control circuit to provide individual section seeding rates and to automatically operate the actuator associated with the given drive shaft in accordance with the error signal.

20 Claims, 2 Drawing Sheets

ELECTRONIC SEED RATE SYSTEM FOR A GRAIN DRILL

BACKGROUND OF THE INVENTION

1) Field of the Invention

The present invention relates generally to agricultural seeding implements having a plurality of metering devices, such as grain drills or the like, and more specifically to a metering control system for such an implement.

2) Related Art

Grain drills typically include a plurality of transversely spaced seed meters with fluted feed wheels driven from a ground wheel for metering seed at a rate proportional to the forward speed of the implement. Changing the seeding rate usually involves either adjusting the ratio of a transmission located between the ground wheel and a drive shaft connected to the fluted feed wheels, or moving the fluted feed wheels within the meter housings by shifting the drive shaft transversely to adjust the effective metering area of the wheels. Gross adjustments to modify, for example, the metering for different types of seeds are usually accomplished by altering a seed gate position and/or changing the transmission speed ratio.

Heretofore it has been difficult for the operator to know the exact seeding rate and to fine-tune the adjustment when moving to a new field or when changing seed varieties, and it has been virtually impossible to change the seeding rate on-the-go for varying conditions. Existing monitor systems to check seeding rate are expensive (especially when each seed row must be equipped with a monitor similar to the arrangements utilized with row crop planters), and providing an effective and affordable controlled or closed loop system for a grain drill has continued to be a problem.

BRIEF SUMMARY OF THE INVENTION

It is therefore an object of the present invention to provide an improved metering system for a seeding implement with a plurality of seed meters, such as a grain drill. It is another object to provide such a metering system which overcomes the aforementioned problems.

It is yet another object of the invention to provide an improved metering system for a grain drill which allows the operator to adjust seeding rate easily for varying conditions. It is a further object to provide such a system which may be adjusted on-the-go and from a location remote from the meters. It is yet another object to provide such a metering system which facilitates fine tuning adjustments independently of more gross adjustments such as transmission gear ratio and/or feed gate setting alterations.

It is still a further object to provide a relatively simple and effective closed loop control for a grain drill metering system. It is another object to provide such a system which detects a large difference between actual and desired seeding rates to provide an alarm to the operator.

It is still a further object to provide an improved metering system which provides an accurate indication of the seeding rate of a grain drill or similar implement. It is still another object to provide such a system which is relatively simple and inexpensive and yet is easily expandable for use with larger and/or multi-sectioned drills. It is a further object to provide such a system which utilizes basically the same electronic control for both single and multiple implement arrangements.

A seeding implement, such as a grain drill, includes a plurality of transversely spaced seed meters each with a rotatable metering member such as a fluted feed wheel supported within a metering housing. A transversely movable drive shaft is operably connected to the rotatable members, and the seeding rate of each of the meters on the drive shaft is changed by moving the shaft transversely. The shaft is rotated at a speed dependent on the forward ground speed of the implement, such as through a conventional ground wheel drive. One or more of the meters includes seed sensing structure connected to a controller which provides an indication of the average seeding rate of the meters based upon the seeds sensed. An actuator moves the drive shaft transversely to vary the seeding rate in response to the seeding rate indication to maintain the preselected rate. The actuator may be operator-controlled from the cab of the towing vehicle to vary the seeding rate on-the-go. In the event there is a large discrepancy between the preselected rate and the actual detected rate, an alarm is triggered to alert the operator.

In another embodiment, a closed loop system automatically operates the actuator in response to an error signal, determined by the difference between the desired and actual seeding rates, to move the shaft and maintain the desired seeding rate. The number of seed sensors required is substantially less than the number of meters on the corresponding drive shaft to reduce cost. If more than one sensor is utilized per shaft, an averaging circuit provides an indication of the average seeding rate. When multiple drills or multiple shafts are being monitored, a switching or multiplexing circuit permits a single controller device to provide the seeding rate indication (and, in the closed loop embodiment, to control the corresponding actuators in accordance with the indication). The switching circuit eliminates the need for multiple controllers and reduces the cost and complexity of the system while still providing complete on-the-go seeding rate control.

These and other objects, features and advantages of the present invention will become apparent to one skilled in the art upon reading the following detailed description in view of the drawings.

DETAILED DESCRIPTION OF THE DRAWINGS

Figure 1:
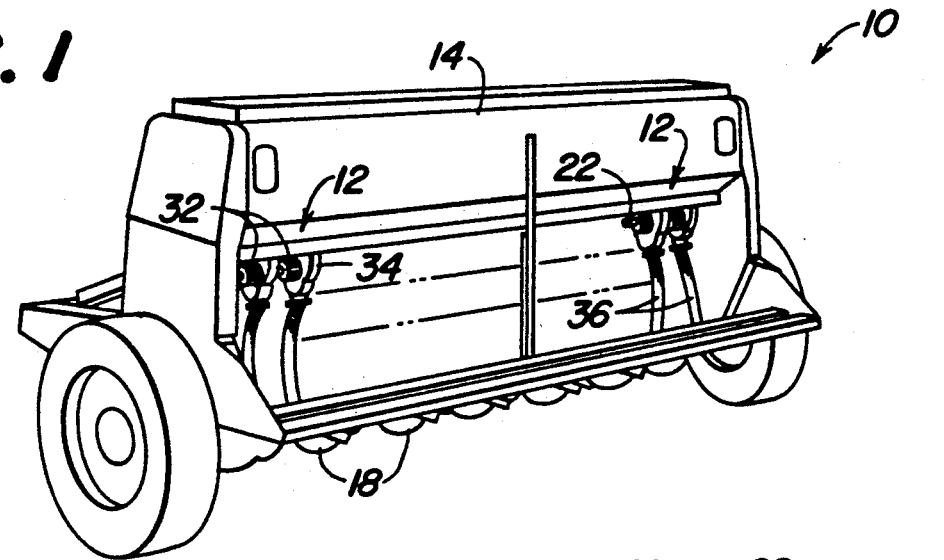
FIG. 1 is a rear perspective view of a portion of a grain drill having a plurality of seed meters on a single drive shaft.
Figure 2:
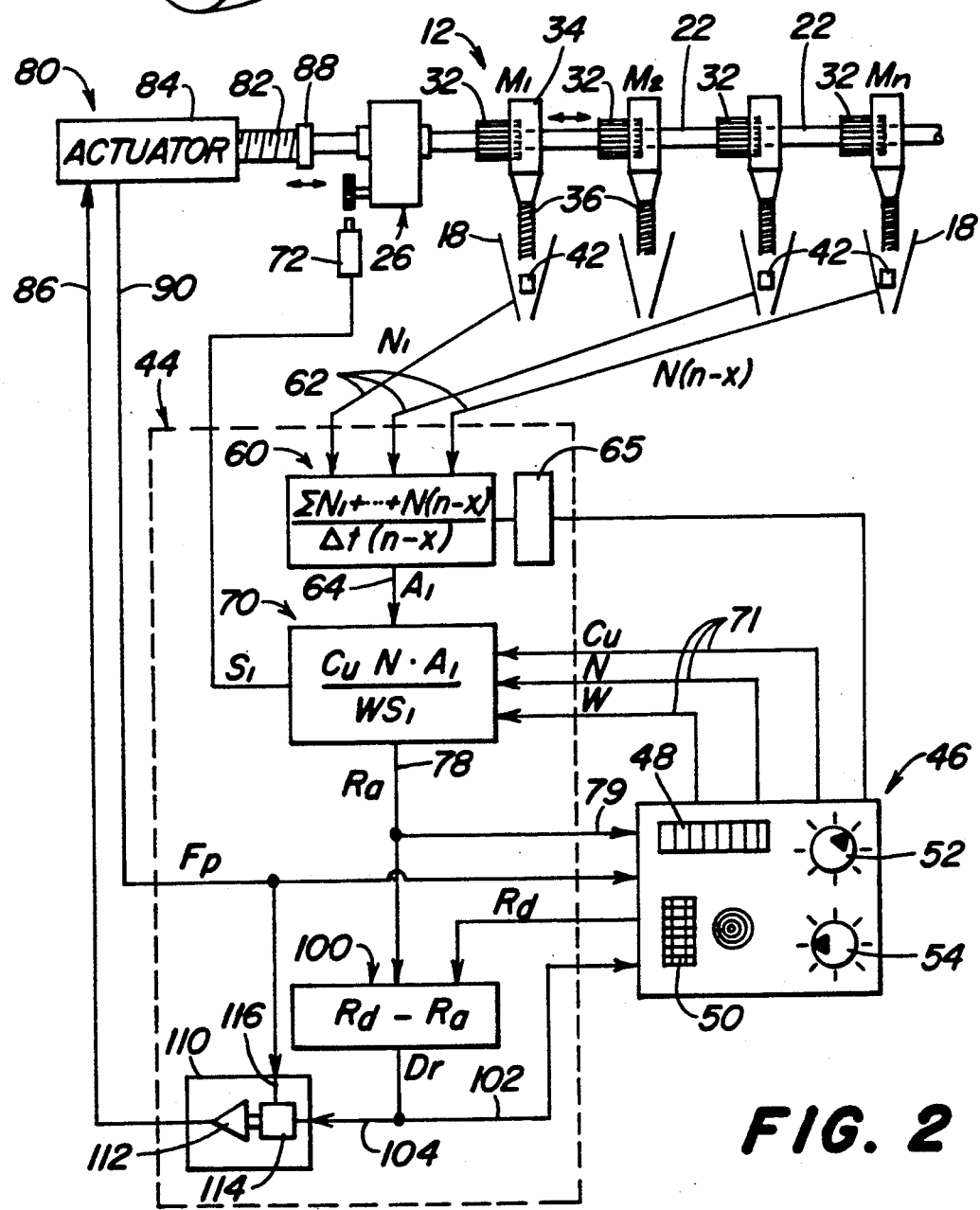
FIG. 2 is a schematic representation of a seeding rate control for the grain drill of FIG. 1.

Referring now to FIGS. 1 and 2, therein is shown a portion of a grain drill 10 having at least a first set of metering devices 12 connected between a source of seeds 14 and furrow forming tools 18. The metering devices 12 are connected to a drive shaft 22 and are driven through a conventional drive arrangement 26 from a ground wheel to meter seeds at a rate proportional to the forward speed of the drill 10 over the field.

The meters 12 are preferably of the type shown in U.S. Pat. No. 4,408,704 of common ownership with the present application, and include transversely shiftable fluted feed wheels 32 slidably received within a meter housing 34. The seeding rate of each meter is varied by moving the fluted feed wheel 32 transversely within the housing to change the effective metering area of the wheel. The feed wheels 32 for the meters 12 are fixed to the drive shaft 22 and the shaft 22 is transversely movable to vary, in unison, the seeding rates of all the meters on the shaft. If, for example, the operator wishes to increase (or decrease) the seeding rate of the meters on the shaft 22 slightly, he would move the shaft 22 to the right (or left) as viewed in FIG. 1 to increase (or decrease) the effective metering area of the fluted feed wheels 32. Larger adjustments which would be necessary when changing from one type of seed to another (i.e., soybeans to a cereal grain) are accomplished by changing the speed ratio of the transmission and/or by repositioning a feed gate in each of the meters.

Each of the metering devices 12 is connected to a seed tube 36 which, in turn, is connected to one of the furrow forming tools 18. As shown in FIG. 2, there are n meters, $M_1-M_n$, associated with the drive shaft 22. Connected to $n-x$ ($n-x$ being at least 1 but preferably less than n) of the seed tubes 36 are seed detecting devices 42. The detecting devices 42 may be of the type utilized in the Micro-Trak TM PC2 Planter Computer system which is commercially available from Pioneer Technology of Sunnyvale, Calif. The ($n-x$) outputs are connected to the input terminals of a control circuit 44, which in turn, is connected to an input-output/alarm (I/O) device indicated at 46. The I/O device 46 includes a readout 48 which selectively provides an indication of the average seeding rate from the monitored meters and various other indications, such as input variables (desired seeding rate $R_D$, row width W, number of rows N, and desired units of measurement such as actual seed count or volume or weight $C_u$) that are entered into the control circuit 44 to calculate seeding rate indications. A keyboard 50 or other conventional input device is utilized to enter the variables as they are selected by a multi-position control switch 52. A second control switch 54 selects output indications to be displayed on the readout 48, such as actual calculated seeding rate, difference between the actual seeding rate and desired seeding rate, as well as positional information regarding the drive shaft 22.

The control circuit 44 includes an averaging circuit 60 having a plurality of inputs 62 connected to the individual seed sensors 42. As shown in FIG. 2, the circuit 60 sums the seed counts or mass indications $N_y$ from the ($n-x$) sensors 42 over a period of time dt and provides an average seeding indication $A_1$ at an output terminal 64 according to the following general formula:

$$A_1=(N_1+ \ldots +N_{(n-x)})/dt(n-x)$$

The circuit 60 optionally includes a comparison circuit 65 for comparing the average $A_1$ with the individual indications from each sensor 42 and providing difference signals:

$$D_y=[A_1-N_y]$$

If one or more of the difference signals is larger than a preselected difference $d_p$ (i.e., $D_x>d_p$), a warning signal at the I/O device 48 is triggered which alerts the operator to a possible uneven seeding condition caused by, for example, a blocked seed tube or an improperly set meter gate.

The output terminal 64 of the averaging circuit 60 is connected to an input terminal of a seeding rate determining circuit 70. The output of a shaft speed sensor 72 is also connected to the circuit 70 to provide a speed signal $S_1$ indicative of the forward speed of the drill 10. Input variable indications for row width W, number of rows N, and the desired conversion units $C_u$, which are entered by the keyboard 50, are communicated to the circuit 70 via lines 71. The circuit 70 calculates the actual seeding rate $R_A$ for the meters $M_1-M_n$ by the following general formula:

$$R_A=(C_u N.A_1)/(WS_1).$$

An output terminal 78 is connected to an input 79 of the I/O device 46 to provide an indication on the display 48 of the actual seeding rate $R_A$, which may be in seeds, volume or weight per acre or hectare dependent upon the units selected by the operator, which will depend on the local customs.

To change the seeding rate from a location remote from the meters 12 in accordance with an indication provided at the display 48, an actuator 80 is operably connected to the meter drive shaft 22 to move the shaft transversely and thereby vary the effective metering areas of the fluted feed wheels 32 associated with the shaft. Preferably, the actuator 80 is an electrical linear actuator having a rotatable threaded member 82 selectively movable axially inwardly or outwardly by a reversible motor 84 when a positive or negative input voltage signal (relative to a preselected reference voltage) is applied to an input terminal via a line 86 from the circuit 44. The member 82 can be either infinitely variable or can be incremented a preselected amount (for example, 1/16th inch upon receipt of a pulse of at least a preselected level and duration at the terminal 86). Alternatively, an electrohydraulic circuit may be utilized with a hydraulic actuator to adjust the shaft 22 transversely. The end of the member 82 is connected to the shaft 22 by a collar 88 which permits relative rotation between the shaft 22 and the member 82 but which constrains the shaft 22 for axial movement with the member 82.

A feedback signal $F_p$ is provided on a feedback line 90 from a potentiometer or other position-sensing device in the actuator 80. The line 90 is connected to the I/O device 46, and the operator may select an actuator position readout on the display 48 using the control switch 54 to determine where the fluted feed wheels 32 are operating within the range of possible transversely adjusted positions. A detector circuit is provided at the I/O device 46 so that when the signal $F_p$ reaches a first or a second level corresponding to the stop or maximum adjusted positions of the shaft 22 a signal is provided to alert the operator that no more adjustment in a given direction is available.

Figure 3:
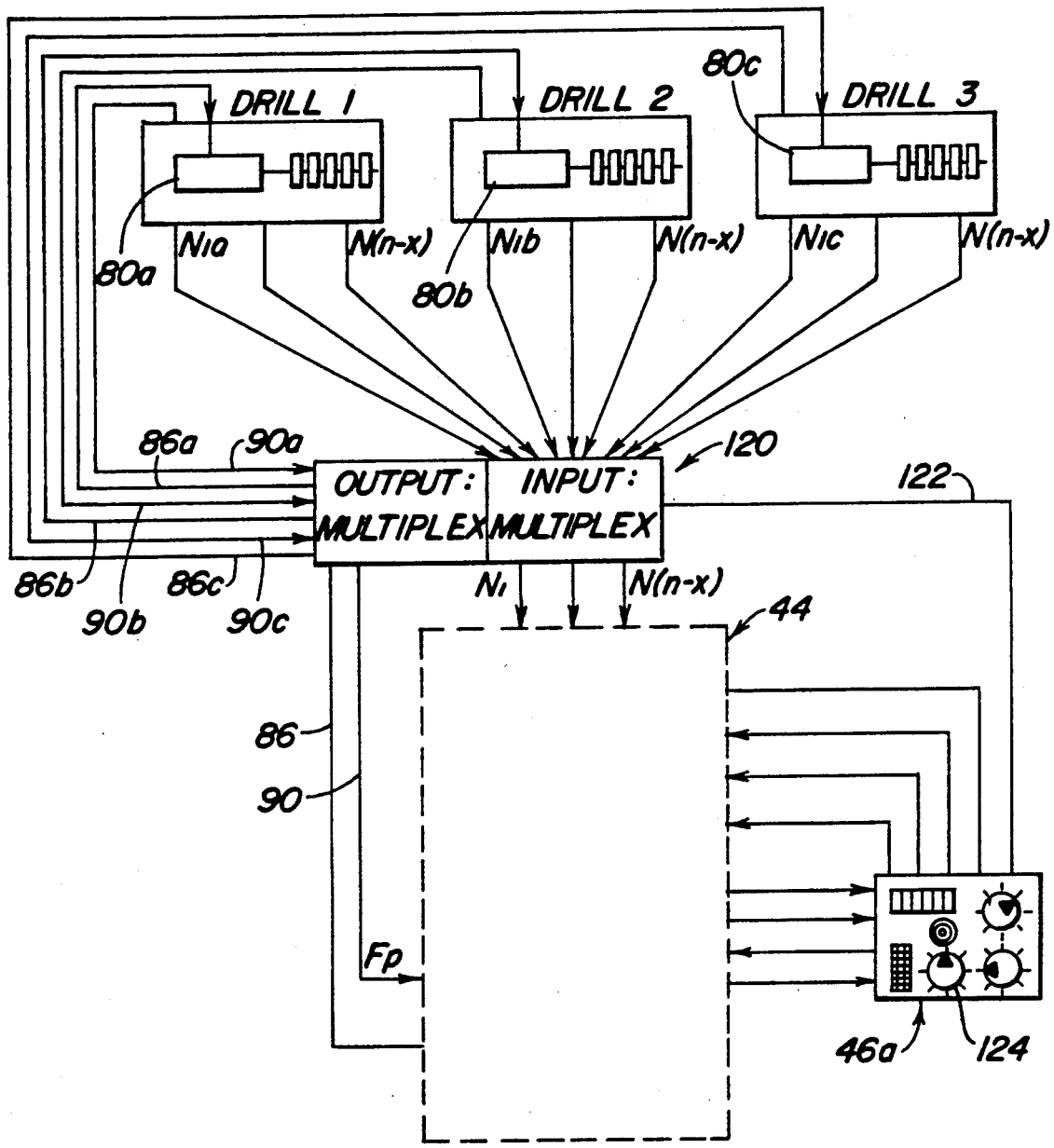
FIG. 3 is a schematic representation of a switched or multiplexed seeding rate control for regulating the meters on several different drills or drive shafts.

As shown in FIGS. 2 and 3, the actuator 80 is part of a closed loop system, including the control circuit 44, which automatically provides a correction signal over the line 86 to adjust the shaft 22 transversely and reduce the difference between the actual seeding rate $R_A$ and the desired rate $R_D$. Alternatively, a control (not shown) may be provided on the panel of the I/O device 46, or at another convenient location in the tractor cab, so that the operator can manually select the desired shaft adjustment from the cab of his tractor, dependent on the indication at the readout 48.

As shown in FIG. 2, a difference determining circuit 100 is connected to the seeding rate determining circuit 70 to provide a difference signal $D_r$:

$$D_r = R_D - R_A$$

which is transmitted to the I/O device via line 102. By viewing the readout 48 with the $D_r$ indication selected by the switch 54, the operator can increment the actuator 80 one or more steps in the direction necessary to reduce the error signal (or, if the actuator is infinitely adjustable, actuate the motor for a short period of time in the proper direction) to fine tune the seeding rate.

As seen in FIG. 2, the error signal $D_r$ is supplied by a line 104 to the input of an actuator driver circuit 110 which includes an output amplifier 112 having an output which is at the reference voltage when the error signal is within preselected limits. When the error signal deviates beyond the preselected limits, the amplifier 112 provides an output signal, the polarity of which with respect to the reference voltage is determined by the error signal $D_r$. If the error signal is negative indicating that the actual rate is greater than the selected desired rate, a negative signal is applied to the actuator to retract the member 82, thereby moving the shaft 22 to the right (as viewed in FIG. 2) and decreasing the effective metering area of the fluted wheels 32 to decrease the seeding rate. If the desired rate is less than the actual rate, a positive signal is applied to the actuator 80 to extend the member 82 and increase the effective metering area of the fluted wheels 32. The number of pulses (or length of the signal) applied from the amplifier 112 to the line 86 is determined by a shaping circuit 114 which controls the amplifier output to yield an actuator signal dependent on the amplitude and polarity of the error signal at the input of the circuit 110. Alternatively, the actual position indication signal $F_p$ may be directed to a control input 116 of the generating circuit 114 so that the amplifier 112 is driven with an input signal of the necessary polarity until the position indication signal $F_p$ changes a preselected amount, the amount being dependent on magnitude of the error signal $D_r$. The error signal, for example, can be gated to timing circuit such as an R-C network which establishes a time period dependent upon the magnitude of the error signal. An unusually large error signal at the output of the circuit 100 will be detected by the I/O device 46 which provides an audio and/or visual alarm to alert the operator of a possible metering system problem.

Conventional analog or digital techniques may be utilized in the control circuit 44. If desired, a microprocessor based control circuit 44 and I/O device 46 may be employed.

Referring now to FIG. 3, therein is shown an alternate embodiment of the invention wherein the seeding rates on multiple sections or individual drills 10a-10c are monitored and controlled with a single control circuit 44 and I/O device 46a. The seed detectors 42 for each drill or drill section are selectively connected in turn through a switching or multiplex circuit 120 to the input of the averaging circuit 60 of the circuit 44. A control line 122 is connected between the I/O device 46a and the multiplex circuit 120, and a selector switch 124 allows the operator to control the circuit 120 to determine which drill or drill section is to be monitored. In addition, the circuit 120 connects the output 86 of the circuit 110 and the feedback line 90 with the actuator 80 for the monitored drill. The operation of the circuit 44 with the controller 46a is substantially identical to that described above for FIG. 2 to control the seeding rate on the selected drill. If desired, the I/O device 46a can include circuitry to continuously cycle the multiplex circuit 120 so that the seeding rates are automatically monitored and adjusted continuously to maintain the seeding rates of the machines 10a-10c within the desired limits. The circuit of FIG. 3 may also be utilized in an open loop fashion by providing a control for remote actuation of the desired actuator 10a-10c under the manual control of the operator while the corresponding drill is selected for monitoring by the multiplex circuit.

Having described the preferred embodiment, it will become apparent that various modifications can be made without departing from the scope of the invention as defined in the accompanying claims.

We claim:

1. In a seeding device having a plurality of transversely spaced seed meters each with a rotatable metering member supported within a metering housing, means for adjustably providing a preselected seeding rate comprising:
   transversely movable drive means operably connected to the rotatable metering members for rotating the metering members, wherein the rotatable members are transversely movable with the drive means for changing the seeding rate of the meters in response to transverse movement of the drive means, means for rotating the drive means at a speed dependent on the forward ground speed of the seeding device, actuator means for moving the drive means transversely on-the-go, and means for controlling the actuator means from a remote location away from the drive means and actuator means to vary the seeding rate of the plurality of the meters.

2. The invention as set forth in claim 1 wherein the seed meters include a fluted feed roll transversely slidable within the housing and connected to the drive means.

3. The invention as set forth in claim 1 including means for electronically providing an indication of the seeding rate of the meters including a seed sensor for providing a seeding rate indication from at least one of the meters.

4. The invention as set forth in claim 3 wherein the actuator means includes means responsive to the seeding rate indication for automatically moving the drive means transversely.

5. The invention as set forth in claim 4 wherein the means responsive to the seeding rate indication includes a controller having an input for selecting a desired seeding rate, means for comparing the desired actual seeding rate with the seeding rate indication to provide an error signal, and an actuator responsive to the error signal.

6. The invention as set forth in claim 1 wherein at least n meters are connected to the drive means, n being an integer larger than one; and means for providing an indication of the seeding rate including means for detecting seeds metered from less than n of the meters.

7. The invention as set forth in claim 6 wherein the means for providing an indication of the seeding rate includes means for providing an average seeding rate of said less than n meters.

8. The invention as set forth in claim 1 wherein the seeding device includes first and second separate implement sections having, respectively, first and second sets of meters with corresponding drive means and actuator means for changing the seeding rate of the first set of meters independently of the rate for the second set of meters, and at least a first seed detector associated with one of the meters on the first set of meters and a second seed detector associated with the meters on the second set of meters, and means connected to the detectors for providing separate seeding rate indications for each of the implement sections.

9. The invention as set forth in claim 8 comprising first and second actuator means corresponding to the first and second sets, respectively, of the meters, wherein the electronic control mans includes means for automatically and independently operating the first and second actuator means on the first and second implement sections, including switching means for operating the actuator means for the first implement section in response to the indications from the first seed detector and for operating the second actuator means for the second implement in response to the indications from the second seed detector.

10. In a seeding device having a first plurality of transversely spaced seed meters adapted for forward movement over a field by a towing vehicle, means for adjustably providing a preselected seeding rate comprising:
 indicator means for providing a seeding rate indication;
 wherein the meters include a housing and a rotatable feed wheel shiftable within the housing to vary the seeding rate of the meter;
 means for driving the feed wheels at a speed dependent on the forward ground speed of the seeding device including a drive shaft connected to the feed wheels; and
 means for changing the seeding rates of the meters including actuator means operably connected to the drive shaft and controllable from the towing vehicle, said actuator means responsive to the seeding rate indication for moving the shaft and therefore the feed wheels axially in response to the seeding rate indication deviating from the preselected seeding rate to simultaneously vary the individual seeding rates of the plurality of the meters to maintain the preselected rate independently of any changes in the rotational speed of the metering members relative to the ground speed.

11. The invention as set forth in claim 10 wherein the indicator means includes a plurality of seed detectors, wherein the number of seed detectors is less than the number of meters.

12. The invention as set forth in claim 10 wherein the indicator means comprises an electronic circuit for providing an indication of the average seeding rate of the meters; means for providing an error signal indicative of the difference between the average seeding rate and the preselected seeding rate; and means connected to the actuator means and responsive to the error signal for operating the shiftable means to reduce the difference between the average and preselected seeding rates.

13. The invention as set forth in claim 10 including first and second shiftable means, each shiftable means connected to a different set of meters, and wherein the indicator means includes means for selectively providing an average seeding rate indication for either set of meters.

14. The invention as set forth in claim 13 including first and second actuator means operably connected to the first and second sets, respectively, of the meters, and means for selectively operating the first and second actuators on-the-go dependent on the selected average seeding rate indication.

15. The invention as set forth in claim 14 wherein the first and second shiftable means include, respectively, first and second drive shafts.

16. The invention as set forth in claim 14 including a single indicator means, and input switching means for selecting one of the two sets of meters and providing an error signal for that set of meters.

17. The invention as set forth in claim 16 further comprising output switching means for operably connecting the indicator means to the corresponding actuator means for the selected set of meters to automatically operate the actuator means to reduce the error signal.

18. The invention as set forth in claim 12 further comprising means for providing a closed loop control system which includes the actuator means and the means for providing an error signal, said closed loop control system for automatically operating the shifting means to reduce the difference between the average and preselected rates.

19. The invention as set forth in claim 1 including means for providing an indication of the position of the drive means, and means responsive to the position indication for activating an alarm as the drive means reaches a preselected limit position.

20. In a seeding device having at least two sets of transversely spaced seed meters, the meters including rotatable metering member supported within a metering housing, means for adjustably providing a preselected seeding rate comprising:
 first and second transversely movable drive means operably connected to the metering members of the respective sets of meters for rotating the metering members, wherein the metering members are transversely movable with their respective drive means for changing the seeding rate of the meters in response to the transverse movement of the drive means; means for rotating the drive means at a speed of dependant on the forward ground speed of the seeding device; first and second actuator means for independently moving the respective drive means transversely on-the-go from a remote location to vary the seeding rate of the respective sets of meters; first and second seed detecting means associated with respective first and second seed set of meters for providing separate seeding rate indications from the sets of meters; and a circuit responsive to the seeding rate indications for selectively controlling the respective actuator means to independently adjust the seeding rate of the two sets of meters.

* * * * *